United States Patent
Ghannam et al.

(10) Patent No.: US 10,179,559 B2
(45) Date of Patent: Jan. 15, 2019

(54) REAR IMPACT GUARD FOR A VEHICLE

(71) Applicant: Ford Global Technologies, LLC, Dearborn, MI (US)

(72) Inventors: Mahmoud Yousef Ghannam, Canton, MI (US); Swadad A. Carremm, Canton, MI (US); Clara Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/471,411

(22) Filed: Mar. 28, 2017

(65) Prior Publication Data

US 2018/0281716 A1    Oct. 4, 2018

(51) Int. Cl.
| | |
|---|---|
| *B60R 19/40* | (2006.01) |
| *B62D 25/08* | (2006.01) |
| *B60R 19/48* | (2006.01) |
| *B60R 19/02* | (2006.01) |
| *B60Q 9/00* | (2006.01) |
| *B60K 37/06* | (2006.01) |

(52) U.S. Cl.
CPC .............. *B60R 19/40* (2013.01); *B60K 37/06* (2013.01); *B60Q 9/008* (2013.01); *B60R 19/023* (2013.01); *B60R 19/48* (2013.01); *B62D 25/08* (2013.01); *B60K 2350/1024* (2013.01)

(58) Field of Classification Search
CPC ....... B60R 19/40; B60R 19/023; B60R 18/48; B60Q 9/08; B62D 25/08
USPC .......................................... 293/117, 118, 119
See application file for complete search history.

(56) References Cited

U.S. PATENT DOCUMENTS

| | | | |
|---|---|---|---|
| 2,660,454 A | 11/1953 | Coumerilh | |
| 3,378,278 A | 4/1968 | Froitzheim et al. | |
| 3,471,070 A | 10/1969 | Olson | |
| 3,501,190 A | 3/1970 | McCrea | |
| 3,580,613 A | 5/1971 | Northrop | |
| 3,871,695 A * | 3/1975 | Koenig | B60R 19/56 293/118 |
| 4,198,070 A | 4/1980 | Weiler | |
| 4,514,002 A * | 4/1985 | McIntosh | B60R 19/56 293/118 |
| 4,582,351 A * | 4/1986 | Edwards | B60R 19/56 293/102 |

(Continued)

OTHER PUBLICATIONS

Byron Bloch, Auto Safety Design, Inc., "Improved Crashworthy Designs for Truck Underride Guards," Paper No. 98-S4-O-07 Oct. 1, 1998, 16th International Technical Conference on the Enhanced Safety of Vehicles, Windsor, Ontario, Canada, 13 pages.

*Primary Examiner* — Joseph D. Pape
(74) *Attorney, Agent, or Firm* — Jason C. Rogers; Brooks Kushman P.C.

(57) ABSTRACT

A vehicle includes a frame and a bumper pivotally connected to the frame. An actuator is mounted to the frame and coupled to the bumper. The actuator is operable to pivot the bumper relative to the frame between a substantially vertical position and an angled position. A user interface is used to activate the actuator. A vehicle controller is programmed to receive a signal from the user interface, and responsive to receiving the signal, activate the actuator to pivot the bumper. The controller may also issue warnings to the driver when the bumper is in an incorrect position for the current driving conditions.

20 Claims, 8 Drawing Sheets

(56) References Cited

U.S. PATENT DOCUMENTS

| | | | |
|---|---|---|---|
| 4,641,871 A * | 2/1987 | Vaughn | B60T 7/22 |
| | | | 180/275 |
| 4,707,939 A | 11/1987 | Bonner et al. | |
| 5,678,872 A | 10/1997 | Slater | |
| 5,979,953 A | 11/1999 | Rinehart | |
| 6,116,667 A | 9/2000 | Torcomian | |
| 6,170,842 B1 | 1/2001 | Mueller | |
| 6,176,529 B1 | 1/2001 | Kitzmiller et al. | |
| 6,604,765 B1 | 8/2003 | Eull | |
| 6,814,378 B1 | 11/2004 | Marmur | |
| 7,086,674 B2 | 8/2006 | Goertz | |
| 7,377,563 B1 | 5/2008 | Demick | |
| 8,011,704 B2 | 9/2011 | Nees et al. | |
| 8,602,467 B2 | 12/2013 | Lee et al. | |
| 2001/0030431 A1 * | 10/2001 | Killday | B60R 19/56 |
| | | | 293/118 |
| 2013/0154229 A1 | 6/2013 | Kim | |
| 2014/0166713 A1 | 6/2014 | Kirtland | |

* cited by examiner

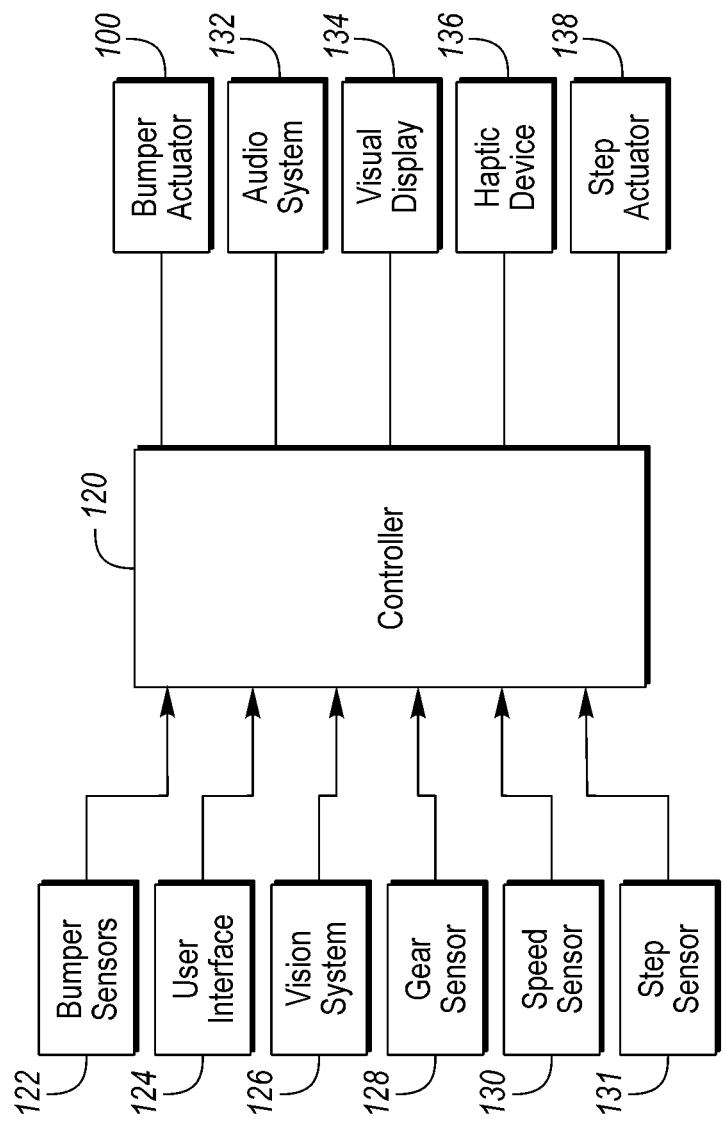

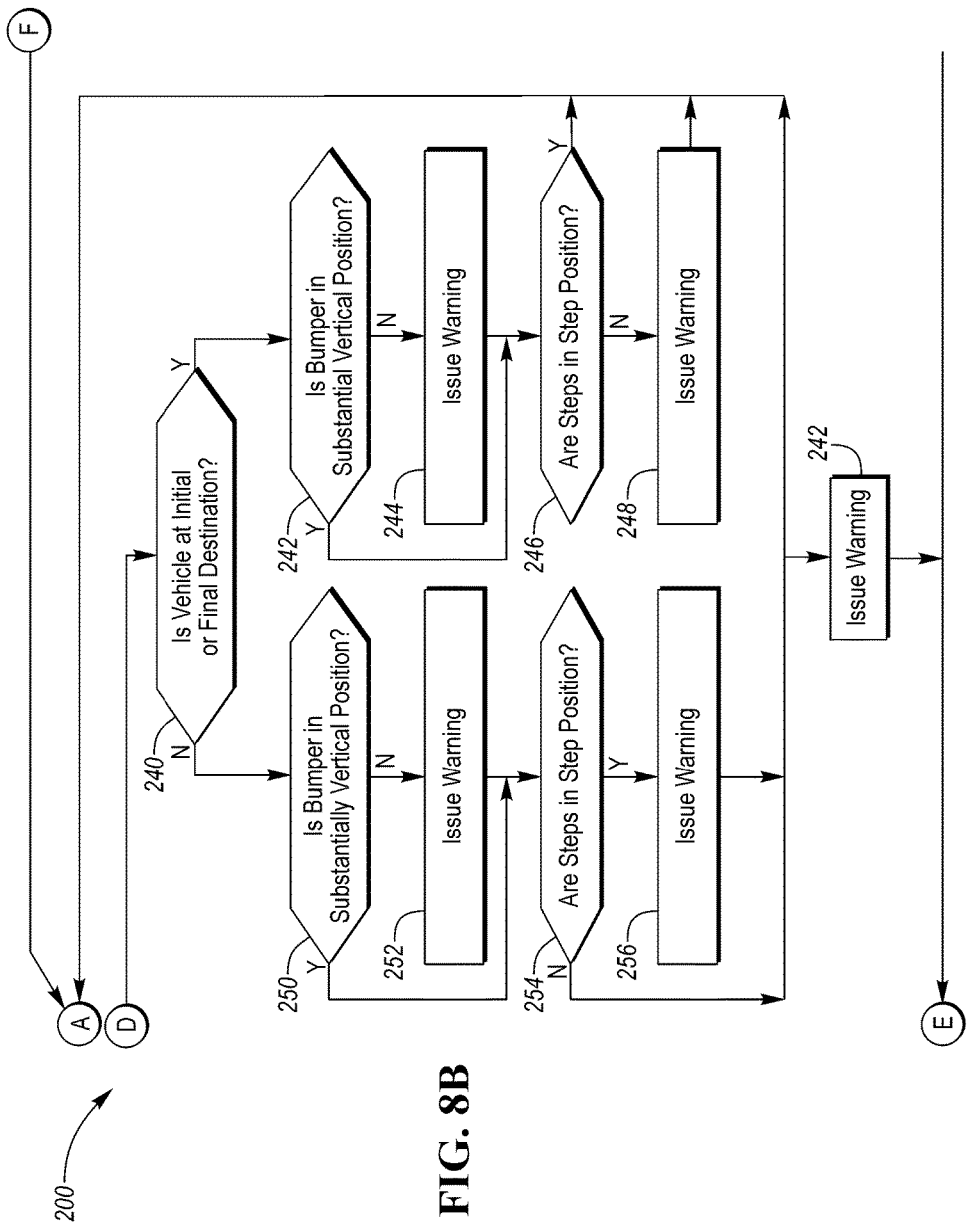

REAR IMPACT GUARD FOR A VEHICLE

TECHNICAL FIELD

The present disclosure relates to rear impact guards for vehicles.

BACKGROUND

Typical rear impact guards include a horizontal bar rigidly connected to a frame of the vehicle by two or more vertical bars. The horizontal bar is typically located at a height estimated to contact a front bumper of a passenger car during a collision.

SUMMARY

According to one embodiment, a vehicle includes a frame and a bumper pivotally connected to the frame. An actuator is mounted to the frame and coupled to the bumper. The actuator is operable to pivot the bumper relative to the frame between a substantially vertical position and an angled position. A user interface is used to activate the actuator. A vehicle controller is programmed to receive a signal from the user interface, and responsive to receiving the signal, activate the actuator to pivot the bumper.

According to another embodiment, a vehicle includes a frame and a bumper pivotally connected to the frame. An actuator is mounted to the frame and coupled to the bumper. The actuator is operable to pivot the bumper relative to the frame between a substantially vertical position and an angled position. A controller of the vehicle is programmed to, in response to the vehicle being in forward mode and the bumper being in the angled position, issue a warning to a driver of the vehicle.

According to yet another embodiment, a vehicle includes a frame and a bumper pivotally connected to the frame. An actuator is mounted to the frame and coupled to the bumper. The actuator is operable to pivot the bumper relative to the frame between a substantially vertical position and an angled position. A vehicle controller is programmed to, in response to the vehicle being in reverse and the bumper being in the vertical position, issue a warning to a driver of the vehicle.

BRIEF DESCRIPTION OF THE DRAWINGS

FIG. 7 is a control system diagram.

FIGS. 8A to 8C illustrate a flow chart of an algorithm for controlling the rear impact guard.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
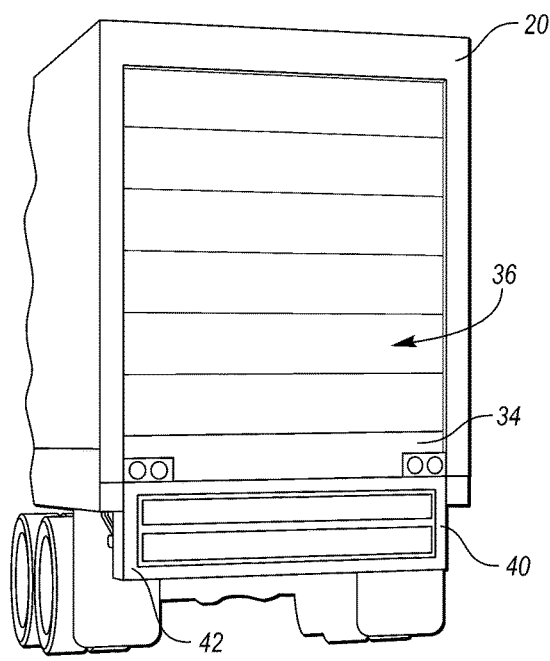
FIG. 1 is a rear perspective view of a vehicle having a rear impact guard.
Figure 2:
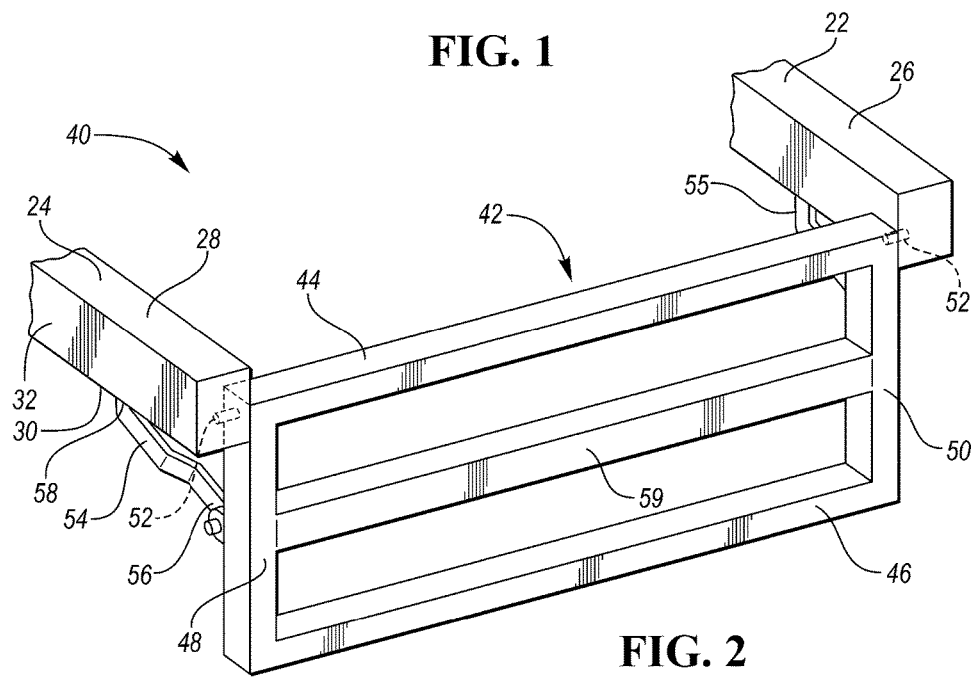
FIG. 2 is a perspective view of the rear impact guard.

Referring to FIGS. 1 and 2, a vehicle 20, such as a large truck or trailer, has a frame 22 including a pair of spaced apart frame rails 24 and 26. Each of the rails 24, 26 may be a rectangular closed-box section having a top 28, a bottom 30, and sidewalls 32 extending therebetween. A deck 34 of the vehicle 20 is supported on the tops 28 of the rails 24, 26 and forms a floor of a storage compartment 36.

The vehicle 20 is equipped with an rear impact guard 40 to comply with government regulations and increase safety to other vehicles. The rear impact guard 40 includes a bumper 42 that extends downwardly from the deck 34 to partially fill the space defined between the deck 34 and the road. During a collision, a front end of a passenger car engages with the bumper 42. The bumper 42 may include a top member 44, a bottom member 46, and side members 48, 50 that are connected between the top and bottom members. In the illustrated embodiment, the members are connected to each other to form a rectangular structure, however, other geometric configurations are contemplated by this disclosure. The members of the bumper 42 may be tubular and may have a rectangular, circular, or other cross-sectional shape.

The bumper 42 is connected to the frame rails 24, 26 near an upper portion of the bumper. The bumper 42 may be pivotally connected to the frame 22 allowing the bumper 42 to pivot between at least a first position, which may be substantially vertical, and a second position which may be angularly oriented and partially retracted forwardly under the vehicle. As used herein "substantially" means within plus or minus five degrees of the stated value or orientation. The bumper 42 may be pivotally attached to the frame 22 by pins or similar means. For example, pins 52 may each extend through one of the frame rails 24, 26 and one of the side members 48, 50. In the illustrated embodiment, the bumper 42 is connected directly to the frame 22; however, in other embodiments, brackets may be used to facilitate the attachment of the bumper 42 to the frame 22. For example, the pins 52 may be received in holes defined in the brackets.

The rear impact guard 40 may include struts 54, 55 each connecting between one of the frame rails 24, 26 and one of the side members 48, 50. The struts 54 and 55 each have a first end 56 connected to the side member 48 and a second end 58 connected to an actuator that is mounted to the frame rail 24. This will be described in more detail below. The first end 56 may be pivotally attached to the side member 48 by a pin or the like.

The bumper 42 may include one or more cross members 59 vertically located between the top member 44 and the bottom member 46 and connecting between the side members 48, 50. The cross member 59 increases the strength of the bumper 42 and provides a collision surface that a vehicle may impact during a collision. The cross member 59 may be stationary and welded to the side members 48, 50. In some designs, the cross members may be utilized as a step for accessing the storage compartment 36.

Figure 3:
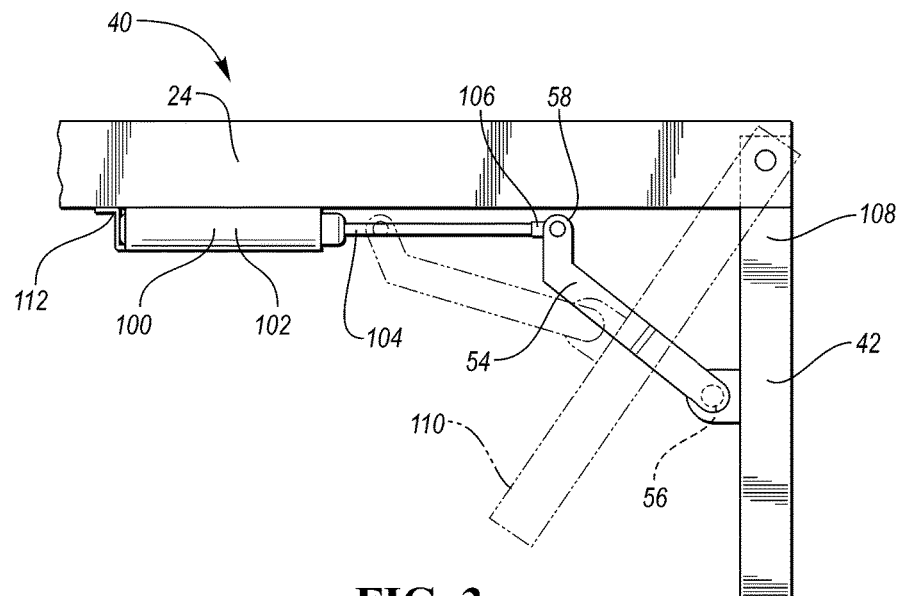
FIG. 3 is a side view of the rear impact guard illustrating different positions of the underside bumper.

Referring to FIG. 3, the bumper 42 of the rear impact guard 40 may be pivotal with respect to the frame 22 and include one or more actuators 100 that control the angular position of the bumper 42. In one or more embodiments, the rear impact guard 40 includes a pair of actuators 100 each connected to one of the rails 24, 26 of the frame 22. The actuators 100 may be hydraulic, pneumatic, mechanical, or electrical. The illustrated actuator 100 is a hydraulic cylinder having a cylinder body 102 mounted to the frame rail 24 by a bracket 112 and a piston rod 104 that is movable relative to the cylinder body 102. A pair of hydraulic lines (not shown) are connected to the cylinder body 102 and selectively supply, or remove, fluid to one or more chambers within the cylinder body 102 to actuate the rod 104. The second end 58 of the strut 54 may be connected to the distal end 106 of the rod 104 using a pin or other connection that allows rotation of the strut 54 relative to the rod 104. The vehicle 20 may also include a second actuator that is mounted to the frame rail 26 and is connected with the strut 55.

The one or more actuators 100 may be configured to dampen impact forces during a collision by allowing controlled forward pivoting of the bumper 42. For example, the actuator 100 can dampen collision energy by allowing the rod 104 to slide into the cylinder body 102 in a controlled manner. The actuator 100 may include a relief valve that allows pressure to be released during a collision to absorb impact forces. The cylinder bodies 102, the rods 104, the struts 54, 55, and the brackets 112 may be designed to deform in response to a collision with the bumper 42 to further absorb impact energy.

The one or more actuators 100 may also be operable to pivot the bumper 42 according to driver demand. The actuators 100 may pivot the bumper 42 between at least a first substantially vertical position 108 and a second angled position 110 in which the bumper 42 is retracted forwardly and upwardly under the vehicle 20. For example, the driver can actuate the bumper 42 to the second position 110 to gain additional ground clearance and lower the bumper 42 to the first position 108 while driving on the roadways.

Figure 4:
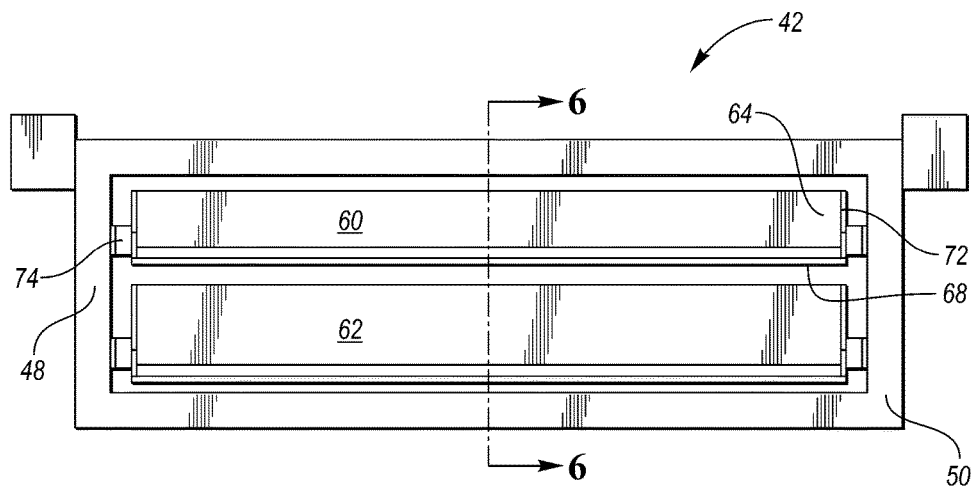
FIG. 4 is a rear elevation view of the rear impact guard.
Figure 5:
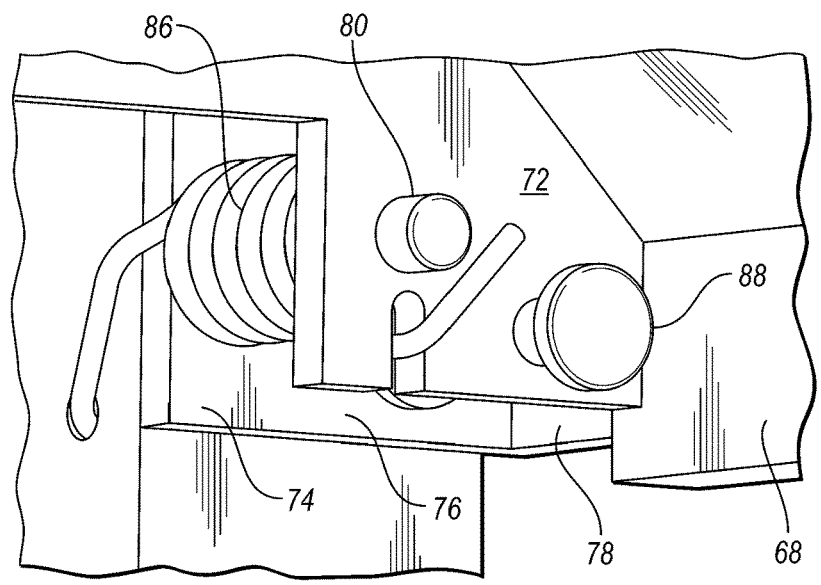
FIG. 5 is a perspective of view of a connection that attaches a step to a bumper of the rear impact guard.
Figure 6:
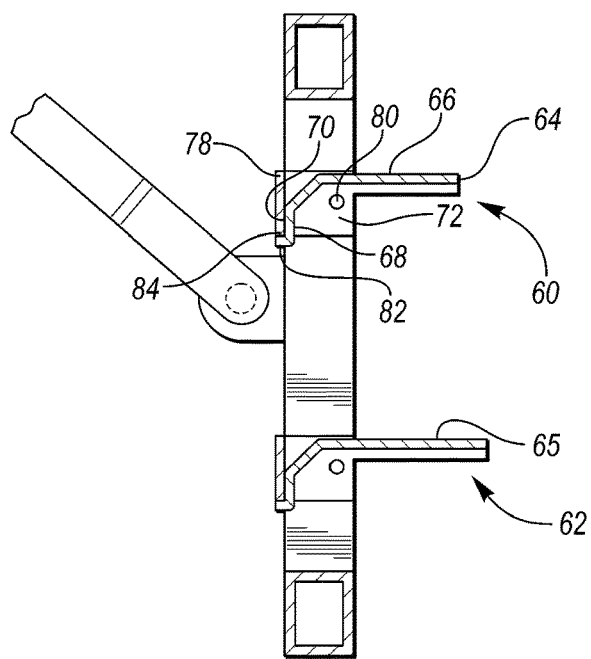
FIG. 6 is a side cross-sectional view of the rear impact guard at cutline 6-6 showing the steps in a step position.

Referring to FIGS. 4, 5, and 6, in some embodiments, the bumper 42 includes rotatable steps instead of the stationary crossmember 59 disclosed above. For example, the bumper 42 may include an upper step 60 and a lower step 62 that are each pivotally connected between the side members 48 and 50, and are vertically positioned between the top member 44 and the bottom member 46. The upper step 60 may include a first plate 64 defining a step surface 66 and a second plate 68 defining a back surface 70 that is oriented substantially perpendicular to the step surface 66. A pair of side plates 72 are connected to the plates 64 and 68 at the ends of the step 60. Each of the sides plates 72 may be pivotally attached to a corresponding one of the side members 48, 50 with a bracket 74 as shown, or may be directly attached to the side members. Each of the brackets 74 may be L-shaped and include a side plate 76 attached to one of the side members 48, 50 and a back plate 78 projecting inwardly from the side plate 76.

The upper step 60 may be pivotally attached to the side members 48 and 50 by a pair of pins 80 that each extend through one of the brackets 74 and one of the side plates 72. The upper step 60 is movable between a stowed position (FIG. 4) and a step position (FIG. 6). The step 60 may be biased to the stowed position by one or more biasing members 86. The biasing members 86 may be coil springs received around the pins 80 and engaging between the brackets 74 and the side plates 72.

The upper step 60 may be deployed from the stowed position to the step position by folding the first plate 64 downwardly towards the ground causing the step 60 to pivot about the pins 80. The back plates 78 act as stoppers and engage with the second plate 68 of the step 60 to prevent rotation of the step 60 past the step position. For example, the second plate 68 may include a flange 82 that engages with a bottom edge 84 of each bracket. One or more latches 88 may be provided to secure the step 60 in the step position. The latch 88 may be a spring-loaded pin located on the side plate 72 and receivable within a sleeve (not shown) defined in the bracket 74 to lock the step 60 in place. The step 60 is rotated back to the stowed position by releasing the latch 88 and rotating the step 60 upwardly with the assistance of the biasing members 86. The bracket 74 may include a second sleeve (not shown) that receives the pin of the latch 88 to secure the step 60 in the stowed position.

The lower step 62 may be the same or similar to the upper step 60, and attached to the bumper 42 and operated in a same or similar manner. The first plate 65 of the lower step 62 may be wider than the first plate 64 of the upper step 60 to facilitate climbing the steps.

In the illustrated embodiment of FIGS. 4, 5, and 6, the steps were manually operated. In other embodiments, the steps may be automatically operated by one or more actuators such as an electric motor (not shown). Each electric motor may be mounted to one of the side members 48, 50 of the bumper 42 and may include a spindle drivably connected to one of the steps by a gearing arrangement. The above described latches may be eliminated in the power-step embodiment, or may be included in an automatic form.

Referring to FIG. 7, a vehicle 20 includes a plurality of components that are electrically connected to a controller 120 that is programmed to coordinate the functions of the various components to operate the vehicle 20.

While illustrated as one controller, the controller 120 may be part of a larger control system and may be controlled by various other controllers throughout the vehicle. Any referred to a "controller" means one or more controllers. The controller 120 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The vehicle 20 may include a user interface 124 disposed within a cockpit of the vehicle allowing the driver, or other occupant, to interact with the controller 120. The user interface 124 may be comprised of one or more touch-screen displays; a plurality of buttons, knobs, slides, or the like; and/or a microphone. The vehicle 20 may also include a vision system 126 that senses objects outside of the vehicle. The vision system 126 provides inputs allowing the controller to identify potential collision threats. The vision system 126 may include cameras, radar, ultrasonic sensors, LIDAR, and the like. For example, the controller 120 may display a video stream from the camera to the display allowing the driver to see behind the vehicle.

The vehicle 20 may include a gear shifter that allows the driver to shift a transmission of the vehicle 20 into a desired gear or mode. For example, the vehicle 20 may include an automatic transmission and the gear shifter allows the driver to shift the transmission between at least PARK, REVERSE, NEUTRAL, and DRIVE modes. Alternatively, the vehicle 20 may include a manual transmission and the gear selector allows the driver to place the transmission in one of the gear ratios, i.e., first gear. A gear sensor 128 is operable to output a signal to the controller 120 indicative of the current gear or mode of the transmission. The gear sensor 128 may be part of the gear-shifter assembly or may be part of the transmission.

The vehicle 20 may also include a speed sensor 130 that outputs a signal to the controller 120 indicative of the current speed of the vehicle. The speed sensor 130 may be located within the transmission or other driveline component.

The controller 120 may control operation of the rear impact guard 40. The rear impact guard 40 may include one or more sensors that output signals indicative of present positions or statuses of one or more components of the rear impact guard 40 such as the bumper 42, the bumper actuators 100, the steps (60 and 62), and the step actuators 138. One or more bumper sensors 122 may be provided to determine the angular position of the bumper 42 relative to the frame 22. The controller 120 includes logic that determines if the bumper 42 is in the substantially vertical position 108, in the angled position 110, or in some intermediate position based on signals from the bumper sensors 122 and/or other available inputs. The sensor 122 may be optical, ultrasonic, mechanical, magnetic (e.g., hall effect sensor), or the like. The rear impact guard 40 may include a combination of different types of sensors to determine the position of the bumper 42. For example, the controller 120 may use a camera and an angular position sensor. The sensors may be located at different locations of the rear impact guard according to the type of sensor being used. For example, an angular potential sensor may be located on the bumper 42 or frame 22 at the pivot point of the bumper 42; a linear potential sensor may be located on the frame 22 or the actuator 100 to measure the position of the piston rod 104; or a pressure sensor may be used to measure the pressure within the cylinder 102.

The rear impact guard 40 may also include a step sensor 131 (if the guard includes movable steps) that outputs a signal to the controller 120 indicative of a position of the one or more steps 60, 62. The controller 120 includes logic that determines if the steps are in the stowed position or in the step position. If the rear impact guard 40 includes automatic steps, the step actuators 138 may provide feedback to the controller 120 used to determine the position of the steps.

The controller 120 may output information to the driver via the user interface 124 based on signals from the bumper sensor 122 and the step sensor 131. For example, an indicator may be provided on the dashboard and state the current angular position of the bumper 42. Other indicators may also be provided to inform the driver of the current position of the steps 60, 62.

The user interface 124 also allows the driver to raise or lower the bumper 42 and the steps 60, 62, if the steps are automatic. For example, the user interface 124 may include one or more buttons (mechanical or capacitive touch) that the driver, or other occupant, presses to pivot the bumper 42 between the substantially vertical position 108 and the angled position 110. The controller 120 is electrically connected with the actuator 100, and may command the actuator to pivot the bumper 42 in response to signals from the user interface 124. The user interface 124 may also include one or more other buttons (mechanical or capacitive touch) for operating the steps.

The controller 120 may issue warnings, associated with the rear impact guard, to the driver. The warnings may be issued in response to potential bumper collisions, incorrect bumper position for current driving conditions, or incorrect step position for current driving conditions. The warnings may be issued via an audio system 132, a visual display 134, a haptic device 136, or a combination thereof depending upon vehicle equipment.

The controller 120 may automatically pivot the bumper 42 in response to certain conditions being present. For example, the controller 120 may automatically lower the bumper 42 to the substantially vertical position if the vehicle is moving forward and is above a predefined threshold speed, e.g., 15 miles per hour (MPH). The controller 120 may also be programmed to automatically raise the bumper 42 in response to the vehicle reversing and a potential collision threat to the bumper 42 being identified by the vision system 126. For example, the controller 120 may command the bumper 42 to the angled position 110 to prevent impact with a loading dock.

Control logic or functions performed by controller 120 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 120. Of course, the control logic may be implemented in software, hardware, or a combination of software and hardware in one or more controllers depending upon the particular application. When implemented in software, the control logic may be provided in one or more computer-readable stowed devices or media having stored data representing code or instructions executed by a computer to control the vehicle or its subsystems. The computer-readable stowed devices or media may include one or more of a number of known physical devices which utilize electric, magnetic, and/or optical stowed to keep executable instructions and associated calibration information, operating variables, and the like.

Figure 8A:
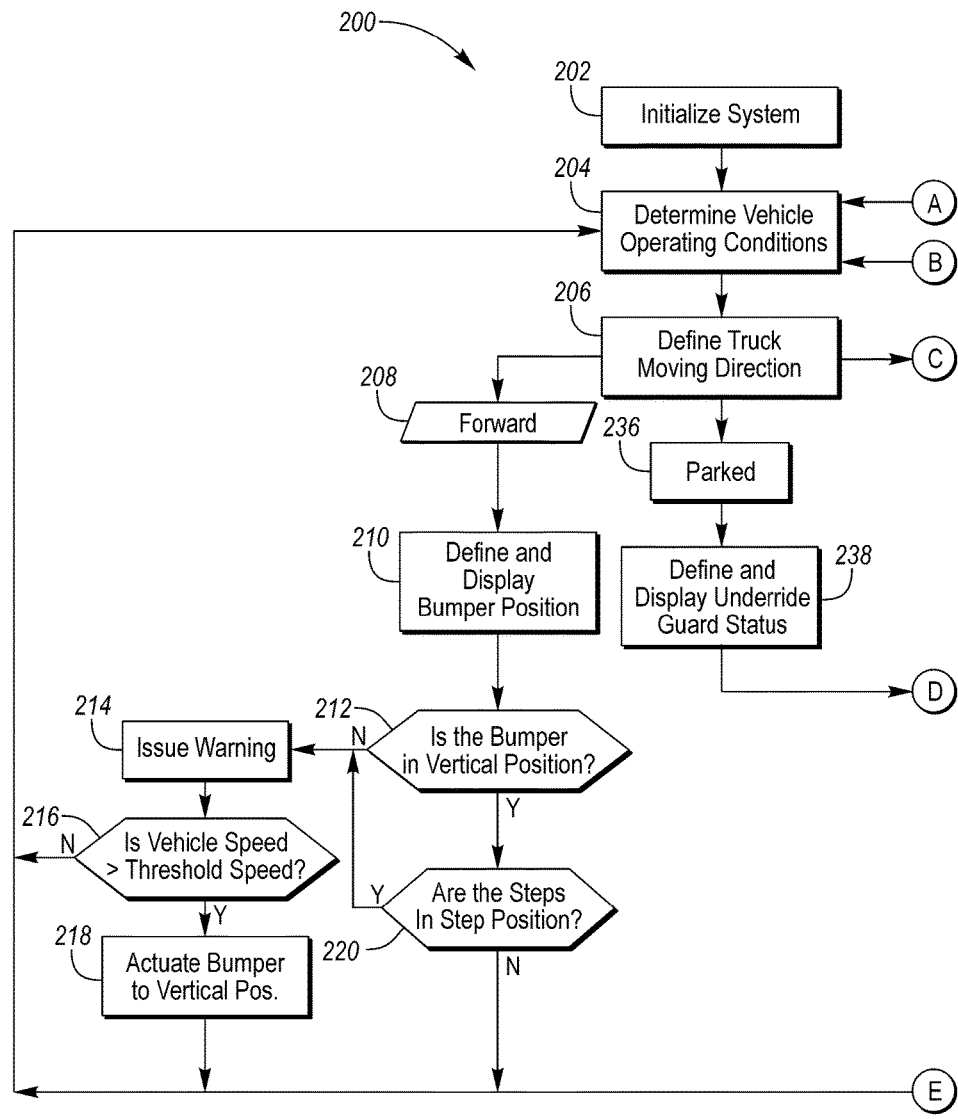
Figure 8C:
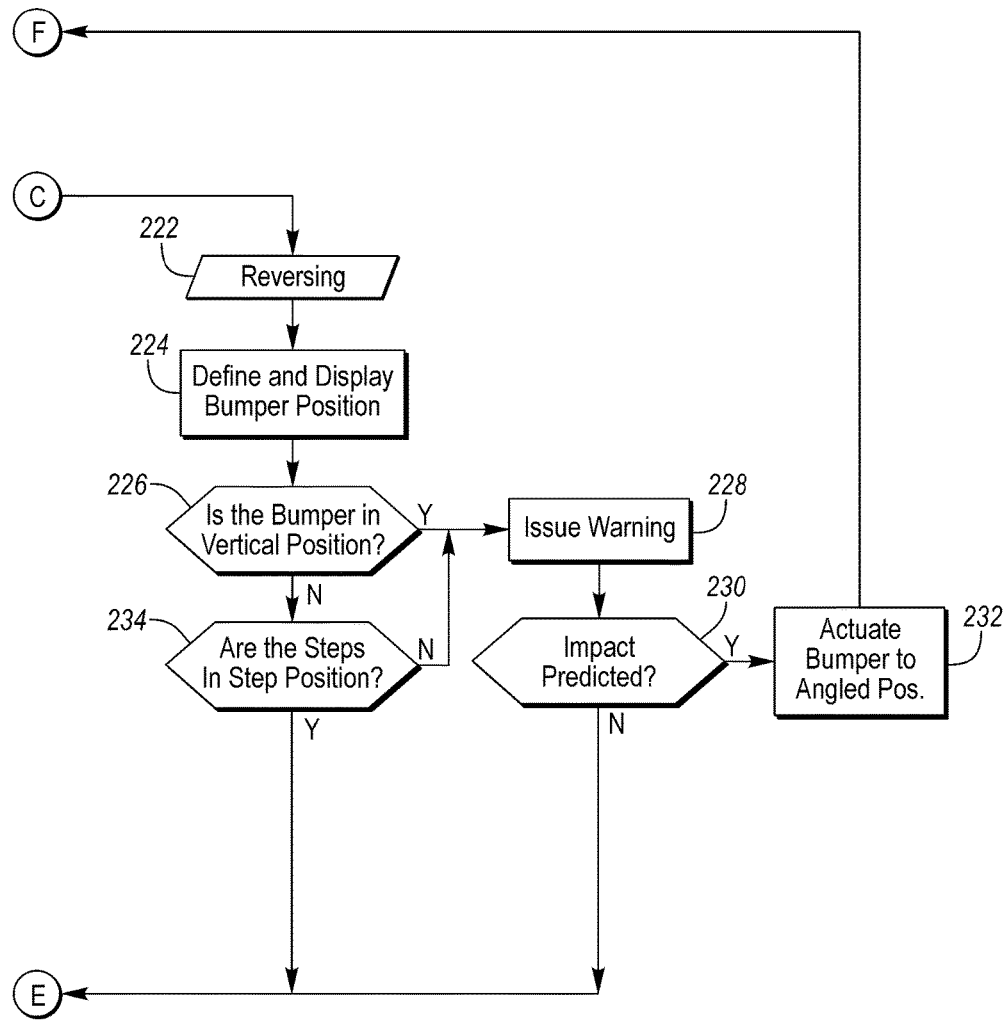

FIG. 8 is a flowchart 200 of an algorithm for controlling operation of a rear impact guard according to one or more embodiments. The system is initialized at operation 202 in response to the driver turning on the ignition of the vehicle. At operation 204 the controller receives signals from the various sensors to determine the current operating conditions of the vehicle such as vehicle speed, transmission conditions, engagement state of the parking brake, driver-demanded torque, and steering angle. At operation 206 the controller defines the current moving direction, i.e., forward, reverse, or park, of the vehicle. The controller may determine the moving direction of the vehicle based on the mode or gear of the transmission, vehicle speed, engagement state of the parking brake, or the like.

Control passes to operation 208 if the vehicle is moving forward. At operation 210 the controller determines the current position of the bumper and displays it on the user interface. At operation 212 the controller determines if the bumper is in the substantially vertical position. If no, the controller issues a warning message to the driver via the audio system, the visual display, and/or the haptic device at operation 214. Control then passes to operation 216 and the controller determines if the vehicle speed is greater than a threshold speed. If yes, the controller 120 commands the actuator(s) to pivot the bumper to the substantially vertical position at operation 218. If no at operation 216, no action is taken and control loops back to operation 204.

If yes at operation 212, control passes to operation 222 and the controller determines if the steps are in the step position. If the steps are in the step position, control passes operation 214 and a step warning is issued to the driver. If the steps are in the stowed position, control passes back to operation 204.

Control passes to operation 222 if the vehicle is moving in reverse. At operation 224, the controller determines the current position of the bumper and displays it on the user interface. At operation 226 the controller determines if the bumper is in the substantially vertical position. If yes, control passes to operation 228 and the controller issues a warning to the driver. At operation 230 the controller determines if an object, located in a predicted reverse path of the vehicle, is a potential collision threat to the bumper. If yes, the controller may command the actuator to raise the bumper to the angled position to avoid impact with the object at operation 232.

If the bumper is not in the substantially vertical position at operation 226, control passes to operation 234, and the controller determines if the steps are in the step position. If no, control passes to operation 228 and the controller issues a warning. If yes, control passes back to operation 204.

In the illustrated embodiment, a warning is issued to the driver in response to the vehicle reversing and the bumper being in the substantially vertical position; however, in other embodiments, a warning is only issued if the controller senses a potential collision object within the predicted path of the vehicle.

Control passes operation 236 if the vehicle is in park. At operation 224, the controller 120 determines the current position of the bumper and displays it on the user interface. At operation 240, the controller determines if the vehicle is at an initial or final destination. The controller may determine this by comparing the current position of the vehicle to route data input by the driver. The vehicle may include an onboard GPS unit to determine the vehicle's current location. If the vehicle is at an initial or final destination control passes to operation 242 and controller determines if the bumper is in the substantially vertical position. If no, a warning is issued to the driver at operation 244 as it is desirable for the bumper to be in the substantially vertical position when the vehicle is being loaded or unloaded. If yes, control passes to operation 246 and the controller determines if the steps are in the step position. If no, a warning is issued to the driver at operation 248 as it is desirable for the steps to be in the step position during the loading and unloading.

If the vehicle is not at its initial or final destination, control passes from operation 240 to operation 250 where the controller determines if the bumper is in the substantially vertical position. If no at operation 250, control passes operation 252 and a warning is issued to the driver. If yes, control passes to operation 254 and the controller determines if the steps are in the step position. If yes, a warning is issued to the driver at operation 256.

Figure 9:
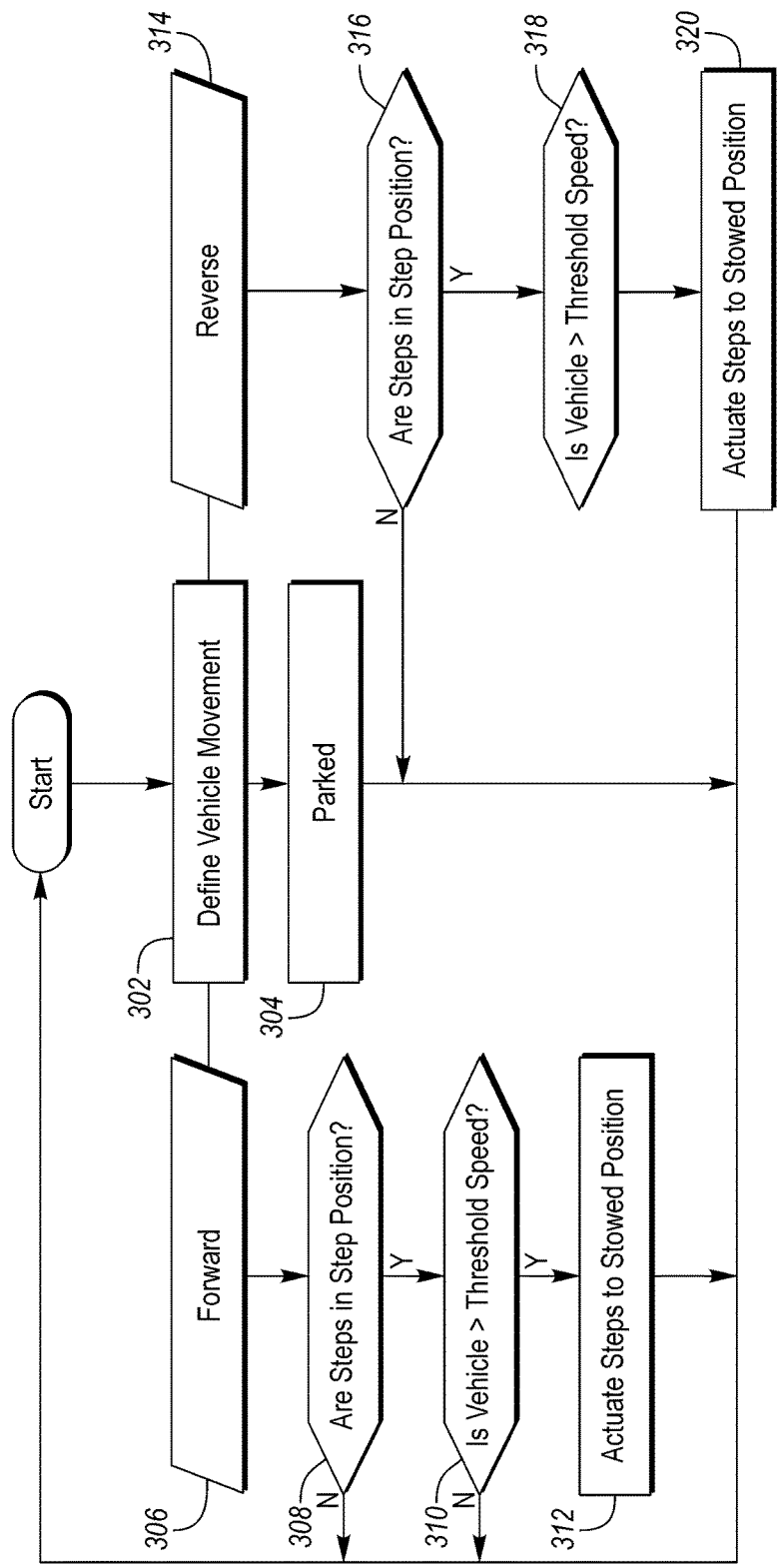
FIG. 9 is a flowchart of an algorithm for controlling operation of the steps of a rear impact guard having power steps.

FIG. 9 is a flowchart 300 of an algorithm for controlling operation of the steps for a rear impact guard having power steps. At operation 302 to the controller determines current vehicle movement. If the vehicle is parked, control passes to operation 304 and no action is taken with regards to the steps. If the vehicle is moving forward, control passes to operation 306 and the controller determines if the steps are in the step position. If yes, control passes to operation 310 and the controller determines if the speed of the vehicle exceeds a threshold speed such as 15 MPH. If yes, the controller actuates the steps to the stowed position at operation 312. If no, no action is taken and control loops back to the start.

Control passes to operation 314 if the vehicle is in reverse. The controller determines if the steps are in the step position at operation 316. If yes, control passes operation 318 and the controller determines if the vehicle speed is greater than a threshold speed. The threshold speed may be the same as the threshold speed of operation 310 or may be a different speed. If yes to operation 318, control passes to operation 320 and the controller actuates the steps to the stowed position.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
   a frame;
   a bumper pivotally connected to the frame and having side members;
   a step including a step surface, the step being pivotally attached between side members so that the step is movable between a stowed position and a step position in which the step surface is substantially parallel to the ground;
   an actuator mounted to the frame, coupled to the bumper, and operable to pivot the bumper relative to the frame between a substantially vertical position and an angled position;
   a user interface for activating the actuator; and
   a controller programmed to receive a signal from the user interface, and responsive to receiving the signal, activate the actuator to pivot the bumper.

2. The vehicle of claim 1, wherein the controller is further programmed to, in response to the vehicle being in forward mode and the bumper being in the angled position, issue a warning to a driver of the vehicle.

3. The vehicle of claim 2, wherein the controller is further programmed to, in response to the vehicle being in reverse and the bumper being in the vertical position, issue a warning to a driver of the vehicle.

4. The vehicle of claim 1, wherein the actuator is configured to absorb impact energy during a collision allowing the bumper to pivot towards the angled position.

5. The vehicle of claim 1, wherein the user interface is selected from a group consisting of:
   a button;
   a touch screen;
   a switch; and
   a microphone.

6. The vehicle of claim 1, wherein the controller is further programmed to issue a step warning in response to the step being in the step position and the vehicle being in forward mode.

7. A vehicle comprising:
   a frame;
   a bumper pivotally connected to the frame;
   an actuator mounted to the frame, coupled to the bumper, and operable to pivot the bumper relative to the frame between a substantially vertical position and an angled position; and
   a controller programmed to, in response to the vehicle being in forward mode and the bumper being in the angled position, issue a warning to a driver of the vehicle.

8. The vehicle of claim 7, wherein the controller is further programmed to activate the actuator to pivot the bumper to the vertical position in response to a speed of the vehicle exceeding a threshold speed.

9. The vehicle of claim 7, further comprising a sensor configured to output a signal indicative of a position of the bumper to the controller.

10. The vehicle of claim 7 further comprising at least one of an audio system, a visual display, and a haptic device, wherein the warning is issued to the driver by the at least one of the audio system, the visual display, and the haptic device.

11. The vehicle of claim 7, wherein the actuator is a hydraulic cylinder including a cylinder body mounted to the frame and a slidable rod connected to the bumper, wherein the hydraulic cylinder is configured to absorb impact energy during a collision by receiving the rod into the cylinder body which allows the bumper to pivot towards the angled position.

12. The vehicle of claim 7 further comprising a step attached to the bumper so that the step is pivotal between a stowed position and a step position.

13. The vehicle of claim 12, wherein the controller is further programmed to issue a step warning in response to the step being in the step position and the vehicle being in forward mode.

14. The vehicle of claim 12 further comprising a step actuator operable to move the step between the stowed and step positions, wherein the controller is further programmed to, in response to the vehicle being in the forward mode and the step being in the step position, activate the step actuator to pivot the step to the stowed position.

15. A vehicle comprising:
   a frame;
   a bumper pivotally connected to the frame;
   an actuator mounted to the frame, coupled to the bumper, and operable to pivot the bumper relative to the frame between a substantially vertical position and an angled position; and
   a controller programmed to, in response to the vehicle being in reverse and the bumper being in the vertical position, issue a warning to a driver of the vehicle.

16. The vehicle of claim 15 further comprising a vision system operable to detect objects outside the vehicle, wherein the controller is programmed to activate the actuator to pivot the bumper to the angled position in response to a collision object being detected in a path of the vehicle by the vision system.

17. The vehicle of claim 16, wherein the vision system includes an ultrasonic sensor.

18. The vehicle of claim 15 further comprising a user interface for activating the actuator, and the controller is further programmed to receive a signal from the user interface, and responsive to receiving the signal, activate the actuator to pivot the bumper.

19. The vehicle of claim 15 further comprising a step attached to the bumper so that the step is pivotal between a stowed position and a step position.

20. The vehicle of claim 19, wherein the controller is further programmed to issue a step warning in response to the step being in the step position and the vehicle being in reverse.

* * * * *